Nov. 15, 1938.　　　　W. STEINEN　　　　2,136,644
DRESSER SET UTENSIL
Filed Dec. 2, 1936
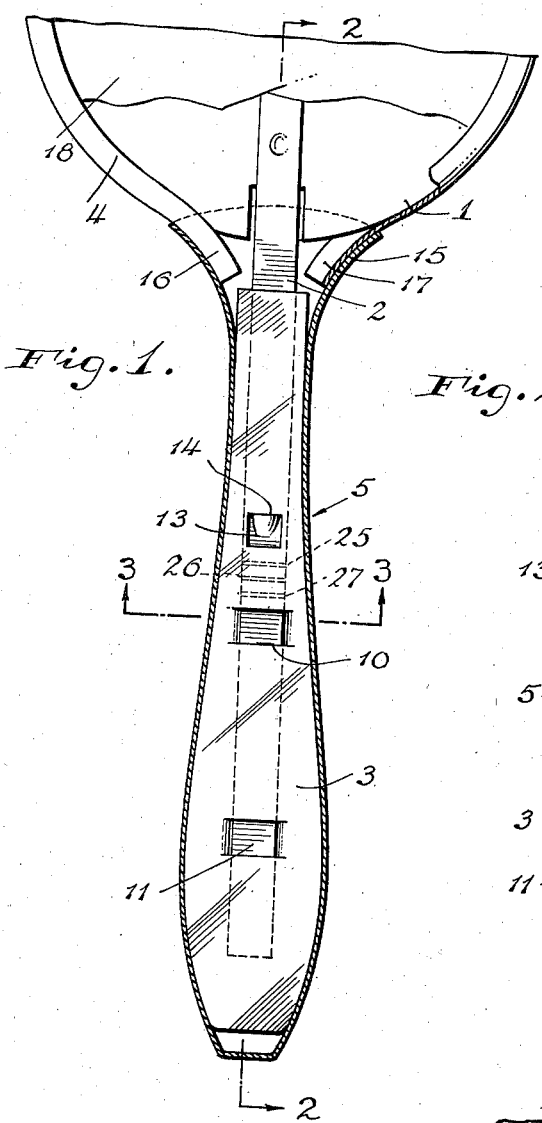
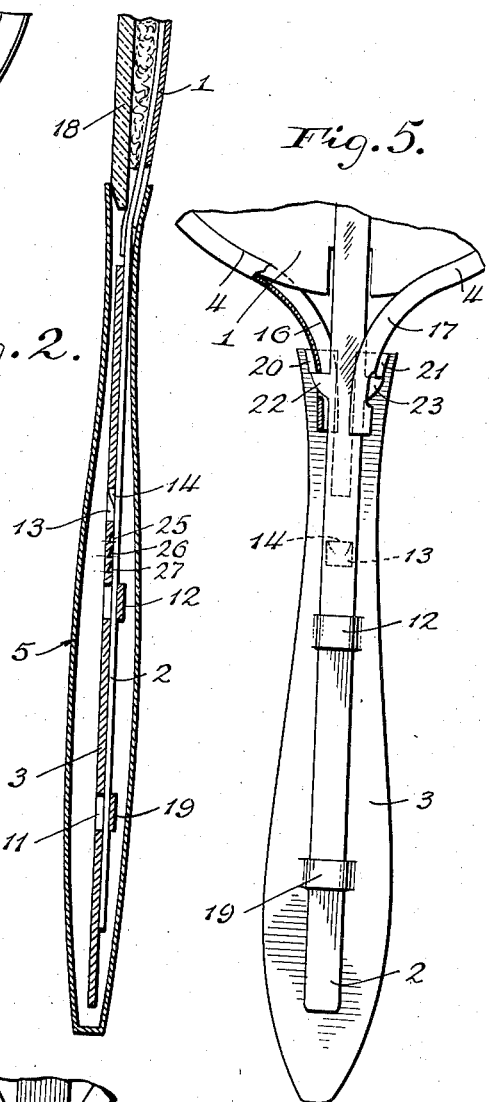
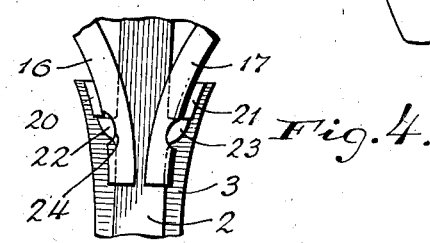
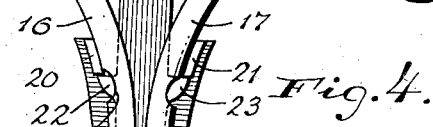
INVENTOR.
WILLIAM STEINEN
BY
Richards & Geier
ATTORNEYS Patented Nov. 15, 1938

2,136,644

UNITED STATES PATENT OFFICE 2,136,644

DRESSER SET UTENSIL

William Steinen, South Orange, N. J.

Application December 2, 1936, Serial No. 113,807

11 Claims. (Cl. 88—102)

The present invention relates to the construction of a vanity mirror, brush or the like.

Heretofore it has been the practice in the art to form the mirror frame and handle as a unitary article. Such a construction would require the use of soldering in the handle which expedient has been found to be expensive.

Applicant has devised a mirror construction in which he has a pressed handle structure which is separately assembled and a main back construction which likewise is separately assembled. Both the handle and main back structure when assembled appear as a unitary structure which has the advantages of the single unit mirror, but at the same time is not as expensive to manufacture. There is no soldering in applicant's handle because said handle is made by complemental members which are pressed together in overlapping relationship. Likewise there are no protrusions extending from the handle to mar the beauty of said handle or to permit a disassembly of said handle from the main body of the mirror construction.

The assembly of the main body of the mirror construction and the handle structure is accomplished by means of an ingenious locking means between said handle and the main part of the mirror construction. When the handle has been separately completed, it is merely slipped on to a rod of the main back construction and automatically locks itself to the main body of the mirror construction so that it may not thereafter be removed. This locking means is likewise completely concealed within the handle structure so as not to affect the appearance of said handle.

The general organization of the structure is such that the mirror may be readily manufactured and assembled with the least expense, and the final product is one which compares in appearance with the more expensive unitary mirror which uses a soldered seam.

The present invention besides being pleasing in appearance is likewise rugged in construction and will withstand the ordinary uses to which it is put. I have shown a preferred embodiment of my invention, and also alternative constructions, in the accompanying drawing of which:

Figure 1 is a front elevational view of the handle and main body of the mirror construction with parts cut away so as to show the details of the locking means between said handle and main body mirror construction.

Fig. 2 is a side elevational view in section, taken through the plane 2—2 of Fig. 1.

Fig. 3 is a sectional view of the handle taken through the plane 3—3 of Fig. 1.

Fig. 4 is a detail view of an alternative form of locking means between the handle structure, the main body, and the rim of the mirror.

Fig. 5 is a front view of the handle structure and the main body of the mirror showing the use of a double lock structure. The shell of the handle structure has been removed in this instance to more clearly illustrate the locking structure.

In the embodiment of my invention shown in Figs. 1 to 3, the main back 1 of the mirror organization has a rod 2 extending therefrom which may be spot welded to the main back 1 or, if preferred, may be made as an integral part of the main back 1. The main back 1 supports a mirror 18 which is held thereon by means of a channel rim 4. This channel rim 4 has two terminal portions 16 and 17 which extend to the base of the main back 1 as shown in Fig 1. It is common to use a filler between the mirror 18 and the main back 1 so as to give a proper backing to the mirror 18.

The handle structure, generally indicated as 5, comprises the shell members 6 and 7 as shown in Fig. 3. These shell members have flanged edges 8 and 9, which are pressed together to form a hollow handle structure which has an upstanding throat portion 15, as shown in Fig. 1. In order to lend rigidity to this hollow handle structure 5, there is positioned between the shells 6 and 7, a reinforcing plate 3. Said reinforcing plate 3 has punched therefrom the apertures 10 and 11 and has formed therefrom the guide members 12 and 19. These guide members are adapted to receive the rod 2, as shown in Fig. 1.

The reinforcing member 3 is likewise pierced at 13 to form a portion of a locking means. The rod 2 has pressed therefrom a lug 14 which is adapted to fit within the recess 13 of the plate 3. The relationship of the lug 14 and the recess 13 is such that when the rod 2 is inserted through the guide members 12 and 19, the lug 14 will snap into the recess 13 as the throat 15 engages the terminal portions 16 and 17 of the rim 4 and the base of the main plate 1.

An additional provision is made to lock the handle 5 on the rod 2 in the form of locking lugs 25, 26, and 27. These lugs 25, 26 and 27 are of less depth than the lug 14 and face downwardly as contrasted with the upward facing of lug 14. The lugs 25, 26 and 27 extend across the width of the rod 2 which is greater than the width of the recess 13. During the assembling of the handle 5 on the rod 2, the lugs 25, 26, and 27 will pass the recess 13 without interference therewith since the lugs 25, 26, and 27 are wider than the recess. The lugs 25, 26, and 27 will engage with corresponding notches in the reinforcing member 3, as shown in Fig. 2. At the same time the lug 14 is positioned within the recess 13, as shown in Fig. 2. It will be seen that any attempt to pull the handle from the rod 2 will be resisted by the upwardly facing lug 14, whereas any attempt to push the handle farther up on the rod 2 will be resisted by the downwardly facing lugs 25, 26, and 27. It is thus seen that the handle 5 has a double lock arrangement on the rod 2 which will eliminate any looseness of the handle on the rod.

The terminal portions 16 and 17 are so shaped as to conform with the interior contour of the throat portion 15 of the handle structure. There is a normal tendency for the terminal portions 16 and 17 to spread apart when the handle is locked on the rod 2. The engagement of the throat 15 of the handle with the terminal portions 16, 17 makes toward a very rigid construction. Said throat is so shaped as to also engage the base of the main plate 1 and the base of the mirror 18.

Fig. 4 shows an alternative form of locking means in which the reinforcing plate 3 has upstanding lugs 20 and 21 punched out of said plate 3 and extended at right angles to the plane of said plate. The rod 2 has the wedge shaped locking ears 22 and 23 which are adapted to engage with the base portions of the lugs 20 and 21. In the assembly of the device, of Figure 4, movement of the rod 2 downwardly between the lugs 20, 21 will spread said lugs 20, 21 apart due to their engagement with the ears 22 and 23. When the ears 22 and 23 have passed the lugs 20, 21, said lugs snap over the ears 22 and 23 to form a firm lock between the plate 3 and the rod 2. The terminals 16 and 17 of the rim 4 are cut away as indicated at 24 so that the ears 22 and 23 may project through the channel rim.

Fig. 5 illustrates a construction in which a double lock is employed combining the lock 13, 14, of Fig. 1, and the lock 20 to 23 of Fig. 4. The particular constructions of these locks have been set forth in the description above and it is deemed unnecessary to repeat such disclosure. However, it is apparent to one skilled in the art that either of the locks illustrated in Figs. 1 and 4 might be independently used, or both locks might be used together as shown in Fig. 5. The assembly of the device appears to be obvious.

However, it should be made clear that the handle structure is manufactured independent of the main body structure, and the two are then assembled. Thus the handle 5 is first made by pressing into a unitary handle structure the shell members 6 and 7 having therebetween the reinforcing plate 3. The handle structure assumes the shape shown in Figs. 1 and 3. This handle structure thus comprises the shells 6, 7, the reinforcing plate 3 which has the guide means 12 and 19, the recess 13, and the upstanding throat portion 15. The mirror 18 is then assembled with the main back plate 1, and is associated therewith by means of the channel rim 4 which has the terminal portions 16 and 17 extending downwardly in the position of Fig. 1. The rod 2 is then inserted into the handle 5 and through the guide members 12 and 19. As the handle 5 is moved over the rod 2, the lug 14 will snap into the position of Fig. 1 within the recess 13. When this lock becomes effective to attach the handle 5 to the main back 1, the throat portion 15 of said handle receives the terminals 16, 17 of the rim 4, and also the bases of the main plate 1 and the mirror 18. It is apparent that the same procedure might be followed in the assembling of the handle structure 5 to the main back 1 by employing the alternative locking means, as shown in Fig. 4; or a double lock such as is shown in Fig. 5.

The above arrangement makes for a very neat organization, in so far as the completed handle which has no exterior protrusions or fastening means may be readily slipped on to the main body of the mirror and be thus permanently locked thereto. The appearance of the organization is in no way marred by the locking means. Furthermore, after the handle is once assembled with respect to the main body of the mirror, there is little likelihood of the handle being removed from said main portion of the mirror construction.

Applicant does not intend to limit himself to the above disclosure, but intends to cover all equivalent structures which are apparent to those skilled in the art and which are covered by the scope of the attached claims.

I claim as my invention:

1. In a device of the character described, the combination of a main back plate to support a mirror, an extension for said back plate, a rim circumscribing said back plate for holding said back plate and mirror together, said rim having terminal portions at the junction of said back plate and extension, a hollow handle member having a reinforcing plate therein extending along the longitudinal length of the handle and having an upwardly flaring throat portion to receive the terminal portions of the rim, and snap locking means between said reinforcing plate and the extension for effectively holding the handle relative to the main plate of the mirror construction after the extension is received by the guide means, said terminal portions and said flaring throat portion having downwardly and inwardly inclined closely conforming channel sections of considerable length to form inclined sliding wedges enabling said rim to be tightened around the peripheries of said mirror and back plate.

2. In a device of the character described, the combination of a main back plate to support a mirror, an extension for said back plate, a hollow handle member having a throat portion to receive the extension, a reinforcing plate for said handle extending along the longitudinal length of the handle, guide means on said reinforcing plate for said extension, and a snap lock associated with the extension and reinforcing plate for effectively holding the same in assembled condition after the extension is received by the guide means, said terminal portions and said flaring throat portion having downwardly and inwardly inclined closely conforming channel sections of considerable length to form inclined sliding wedges enabling said rim to be tightened around the peripheries of said mirror and back plate.

3. In a device of the character described, the combination of a main back plate to support a mirror, an extension for said back plate, a hollow handle member having a throat portion to receive the extension, a reinforcing plate for said handle, guide means punched out of said reinforcing plate for said extension, and a snap lock positioned above said guide means and associated with the extension and reinforcing plate for effectively holding the same in assembled condition after the extension is received by the guide means, said terminal portions and said flaring throat portion having downwardly and inwardly inclined closely conforming channel sections of considerable length to form inclined sliding wedges enabling said rim to be tightened around the peripheries of said mirror and back plate.

4. In a device of the character described, the combination of a main back plate to support a mirror, an extension for said back plate, a lug on said extension, a hollow handle having a throat portion to receive the extension, a reinforcing plate for said handle extending along the longitudinal length of the handle, guide means on said reinforcing plate for receiving the extension, a channel rim circumscribing and embracing the peripheries of said back plate and said mirror having terminal portions at the junction of said back plate and extension, and a recess in said reinforcing plate above the guide means to receive the lug and effectively lock the handle and main plate in assembled relationship after the extension is received by the guide means, said terminal portions and said flaring throat portion having downwardly and inwardly inclined closely conforming channel sections of considerable length to form inclined sliding wedges enabling said rim to be tightened around the peripheries of said mirror and back plate.

5. In a device of the character described, the combination of a main back plate to support a mirror, a rim circumscribing said back plate and having terminal portions at the base of the back plate, an extenson for said back plate, a lug on said extension, a hollow handle having a throat portion to receive the extension and the terminal portions of the rim, a reinforcing plate for said handle extending along the longitudinal length of the handle, guide means on said reinforcing plate for receiving the extension, and a recess in said reinforcing plate above the guide means to receive the lug and effectively lock the handle and main plate in assembled relationship after the extension is received by the guide means, said terminal portions and said flaring throat portion having downwardly and inwardly inclined closely conforming channel sections of considerable length to form inclined sliding wedges enabling said rim to be tightened around the peripheries of said mirror and back plate.

6. In a device of the character described, the combination of a mirror, a main back plate, a rod extending therefrom, a handle comprising complemental shell members and a reinforcing plate sandwiched therebetween, a channel rim circumscribing and embracing the peripheries of said back plate and said mirror having terminal portions at the junction of said back plate and extension, and means operably associated with the rod and the reinforcing plate comprising a snap lock for automatically locking the handle relative to the main back plate when the handle is slipped over the extension rod, said terminal portions and said flaring throat portion having downwardly and inwardly inclined closely conforming channel sections of considerable length to form inclined sliding wedges enabling said rim to be tightened around the peripheries of said mirror and back plate.

7. In a device of the character described, the combination of a main back plate, a rim circumscribing the back plate, said rim having terminal portions, a rod extending therefrom, a handle having an upwardly flared portion to receive the rod, the base of the back plate and the terminal portions of the rim, said handle comprising complemental shell members and a reinforcing plate sandwiched therebetween, and means operably associated with the rod and the reinforcing plate for automatically locking the handle relative to the main back plate when the handle is slipped over the extension rod, said terminal portions and said flaring throat portion having downwardly and inwardly inclined closely conforming channel sections of considerable length to form inclined sliding wedges enabling said rim to be tightened around the peripheries of said mirror and back plate.

8. In a device of the character described, the combination of a main back plate to support a mirror, an extension for said back plate, a pair of ears on said extension, a hollow handle having a throat portion to receive the extension, a reinforcing plate for said handle, guide means on said reinforcing plate for receiving the extension, a channel rim circumscribing and embracing the peripheries of said back plate and said mirror having terminal portions at the juncton of said back plate and extension, and a pair of lugs off set from the plane of the reinforcing plate and positioned to be engaged by the ears of the extension in locking relationship, said terminal portions and said flaring throat portion having downwardly and inwardly inclined closely conforming channel sections of considerable length to form inclined sliding wedges enabling said rim to be tightened around the peripheries of said mirror and back plate.

9. In a device of the character described, the combination of a main back plate to support a mirror, an extension for said back plate, a pair of wedge shaped ears on said extension, a hollow handle having a throat portion to receive the extension, a reinforcing plate for said handle, guide means on said reinforcing plate for receiving the extension, a channel rim circumscribing and embracing the peripheries of said back plate and said mirror having terminal portions at the junction of said back plate and extension, and a pair of lugs off set from the plane of the reinforcing plate and positioned to be spread apart and engaged by the wedge shaped ears of the extension in locking relationship, said terminal portions and said flaring throat portion having downwardly and inwardly inclined closely conforming channel sections of considerable length to form inclined sliding wedges enabling said rim to be tightened around the peripheries of said mirror and back plate.

10. In a device of the character described, the combination of a main back plate to support a mirror, an extension for said back plate, a rim circumscribing said back plate for holding said back plate and mirror together, said rim having terminal portions at the junction of said back plate and extension, a hollow handle member having a throat portion to receive the terminal portions of the rim, and a double lock between the handle and the extension for automatically locking the handle relative to the main plate of the mirror construction when the handle is slipped over the extension rod, said terminal portions and said flaring throat portion having downwardly and inwardly inclined closely conforming channel sections of considerable length to form inclined sliding wedges enabling said rim to be tightened around the peripheries of said mirror and back plate.

11. In a device of the character described, the combination of a main back plate to support a mirror, a rim circumscribing the back plate and having apertured terminal portions at the base of said back plate, an extension for said back plate, a pair of ears on said extension, means to hold said terminal portions together so that said apertures will receive said ears, a hollow handle having a throat portion, said extension being inserted into said handle, a reinforcing plate positioned in said handle, guide means on said reinforcing plate for receiving the extension, and a pair of lugs off set from the plane of the reinforcing plate and engaging the ears of the extension.

WILLIAM STEINEN.